No. 606,950. Patented July 5, 1898.
O. M. YOUNG.
FRUIT GATHERER.
(Application filed Sept. 22, 1897.)
(No Model.)
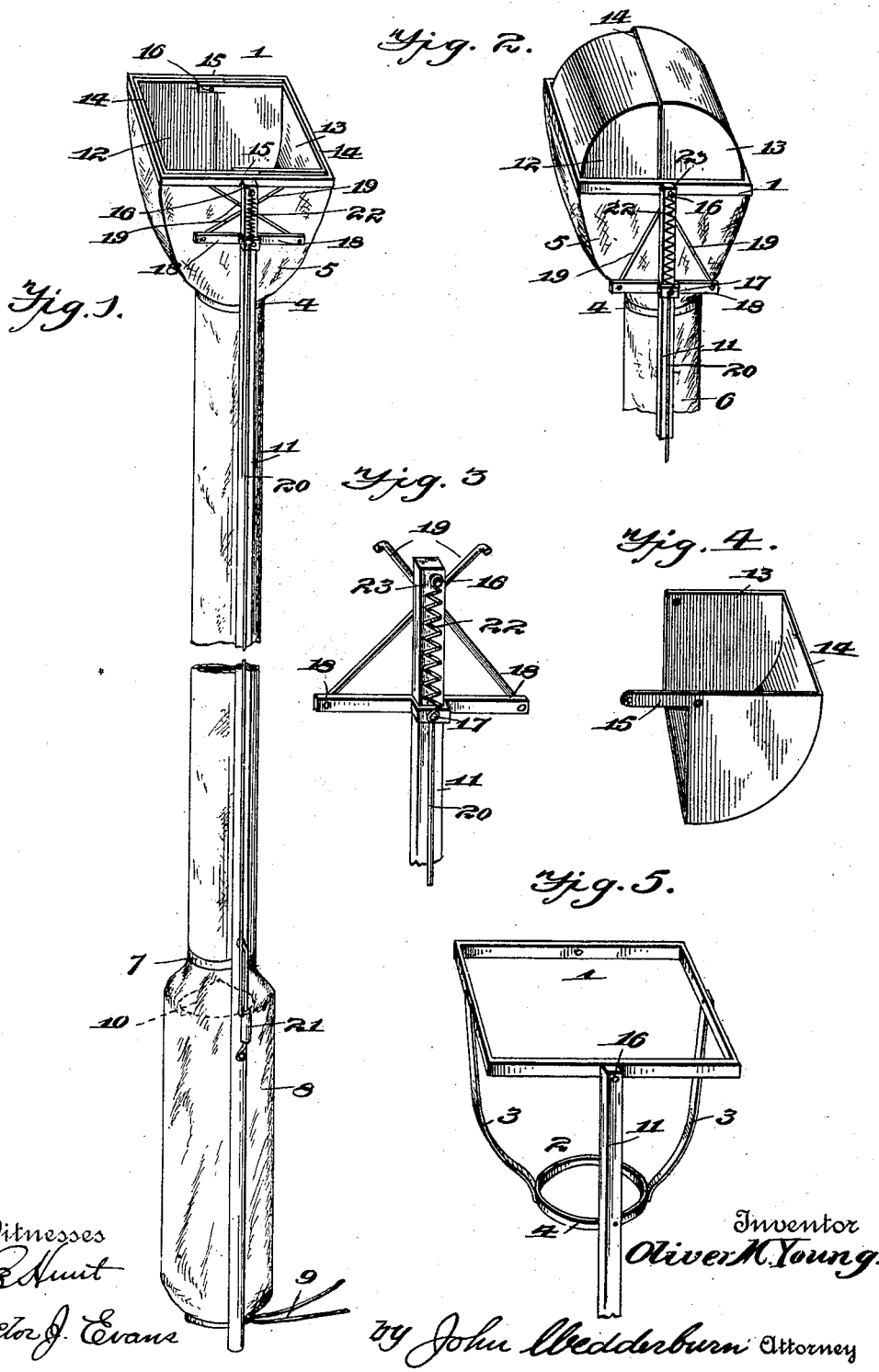

United States Patent Office.

OLIVER M. YOUNG, OF BICKNELL, INDIANA.

FRUIT-GATHERER.

SPECIFICATION forming part of Letters Patent No. 606,950, dated July 5, 1898.

Application filed September 22, 1897. Serial No. 652,609. (No model.)

*To all whom it may concern:*

Be it known that I, OLIVER M. YOUNG, a citizen of the United States, residing at Bicknell, in the county of Knox and State of Indiana, have invented certain new and useful Improvements in Fruit-Gatherers; and I do hereby declare the following to be a full, clear, and exact description of the invention, such as will enable others skilled in the art to which it appertains to make and use the same.

This invention relates to a novel fruit-gatherer, the object being to provide a simple and efficient device by means of which fruits can be gathered from a tree and deposited in a receptacle without bruising the same and without shaking the tree sufficiently to cause the fruit not operated upon by the gatherer to fall to the ground and receive injury.

To the accomplishment of this object the invention consists in providing an elongated conduit with a receptacle at one end and pivoted jaws at the opposite end designed to sever the fruit and to cause it to fall through the conduit into the receptacle.

The invention further consists of certain peculiarities of construction and arrangement which will hereinafter be made apparent.

In the accompanying drawings, forming part of this specification, Figure 1 is a perspective view of my device complete, showing the jaws open. Fig. 2 is a similar view showing the jaws closed, as in the act of severing the fruit. Fig. 3 is a detail view of the jaws. Fig. 4 is a detail view of the jaw-actuating slide and connecting-rods, and Fig. 5 is a detail view of the frame.

Referring to the drawings, 1 indicates a rectangular frame, of light metal, wood, or other suitable material, from which depends a wire frame 2, composed of a number of downwardly-converging rods 3, connected at their lower ends to a ring 4, the frame being covered with canvas or other suitable material to form a hopper 5 between the frame 1 and the ring 4.

6 indicates an elongated tubular conduit, of canvas or the like, secured at its lower end to a ring 7, similar to the ring 4, and below which extends a bag or receptacle 8, open at its bottom and designed to be closed by a drawspring 9.

10 indicates a cushion located within the receptacle 8 immediately below the ring 7 and preferably suspended therefrom, this cushion being composed of wire-netting or other resilient material of substantially conical form and designed to break the fall of the fruit as it drops through the conduit to the receptacle.

11 indicates a substantial brace-rod extending the entire length of the device and secured to each of the rings 4 and 7 and to one side of the rectangular frame 1.

12 and 13 indicate a pair of quadrantal receptacles or jaws of a proper size to fit one within the other and provided with cutting edges 14 and oppositely-extending arms or levers 15 in line with one of the straight edges of the jaws. The jaws are pivoted at their upper corners by a pintle or pintles 16 within the frame 1 and are actuated by a slide 17, mounted upon the brace-rod 11, adjacent to its upper end, and provided with a pair of oppositely-extending arms 18, pivotally connected to a pair of cross connecting-rods 19, pivoted at their opposite ends to the oppositely-extending extremities of the arms 15 upon the jaws. A wire 20 extends downwardly from the slide and is connected to a slide-handle 21, located adjacent to the lower end of the conduit and by means of which the slide 17 may be retracted to cause the jaws to be swung upon their pivots, as indicated in Fig. 2, for the purpose of bringing the cutting edges together and severing the fruit, which drops first to the hopper 5 and thence through the conduit 6 to the receptacle 8, the fall being broken by the cushion 10. The weight of the jaws and their tendency to gravitate to the position indicated in Fig. 1 will ordinarily be sufficient to restore them to their normal positions after having been actuated to sever the fruit; but in order to provide against accidental catching or clogging of the jaws and to insure their return I prefer to mount a spiral or other suitable spring 22 between the upper end of the slide 17 and a projection 23, which may be a pintle 16 at the upper end of the rod 11. It will now be seen that when the device is raised into the tree the fruit will drop into the receptacle formed by the jaws, and a slight pull upon the handle 21 will then cause the jaws to be sprung upwardly to sever the stem of the fruit and cause it to be deposited without injury into the receptacle 8, and the jaws will be immediately restored to their normal position as soon as the hands are removed from the handle.

While the present embodiment of my invention appears at this time to be preferable, I do not desire to limit myself to the structural details illustrated and described, but reserve the right to change, vary, or modify them at will within the scope of the protection granted.

Having thus described my invention, what I claim as new, and desire to secure by Letters Patent, is—

1. In a device of the character described, the combination with an elongated conduit, provided at its opposite ends with a hopper and a receptacle respectively, of a rectangular frame around the upper edge of the hopper, arms depending from the frame and a ring carried at the lower extremities of the arms and encircling the conduit, a brace-rod or handle extending along the outside of the conduit and receptacle and permanently secured to the frame, quadrantal pivoted jaws designed when open to lie within the hopper, and mechanism at the lower end of the brace-rod or handle operatively connected with said jaws, substantially as specified.

2. In a device of the character described, the combination with an elongated conduit provided at its opposite ends with a hopper and a receptacle respectively, of a rectangular frame extending around the upper end of the hopper, converging arms depending from the frame, a ring carried at the lower extremities of said arms and encircling the conduit at its juncture with the hopper, an elongated brace-rod or handle extending longitudinally with respect to the conduit and secured to the rectangular frame, interfitting quadrantal jaws provided with oppositely-extending arms and pivoted at their contiguous corners within the rectangular frame, a slide mounted upon the brace-rod or handle and provided with oppositely-extending arms, connecting-rods intermediate of the slide-arms and the arms around the jaws, a spring located above the slide and designed to actuate the same to retain the jaws normally in their open position, a sliding handle and a rod intermediate of the said handle and of the slide, substantially as specified.

In testimony whereof I have signed this specification in the presence of two subscribing witnesses.

OLIVER M. YOUNG.

Witnesses:
JOHN A. WILBER,
CHARLES B. JUDAH.